Figure 1:
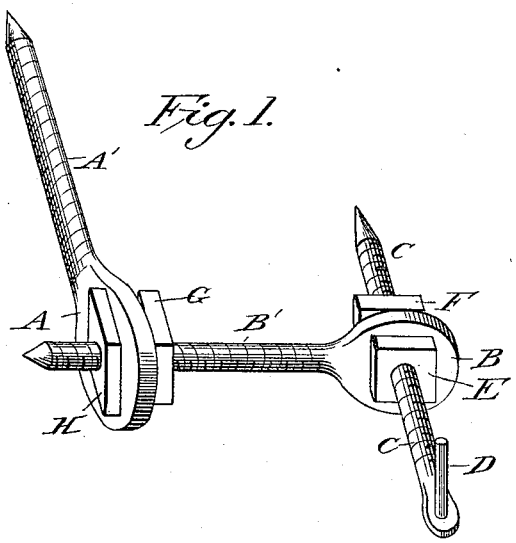

(No Model.)

J. MACY.
GATE HINGE.

No. 440,320. Patented Nov. 11, 1890.

Witnesses:
H. D. Williams
Jas. H. Cotton

Inventor:
James Macy By
Thos. B. Redding, his Attorney in fact.

UNITED STATES PATENT OFFICE.

JAMES MACY, OF STRAUGHN, INDIANA.

GATE-HINGE.

SPECIFICATION forming part of Letters Patent No. 440,320, dated November 11, 1890.

Application filed December 4, 1889. Serial No. 332,612. (No model.)

*To all whom it may concern:*

Be it known that I, JAMES MACY, a citizen of the United States, residing at Straughn, in the county of Henry and State of Indiana, have invented a new and useful Improvement in Gate-Hinges, of which the following is a specification.

My invention relates to improvements in gate-hinges—the parts attached to the posts, and has for its purpose and object the construction of an adjustable and reversible hinge for hanging gates to right or left hand posts, as may be desired, and for putting the gate in vertical position without having to change the gate-post when it may get slightly out of an upright position, and so constructed as to readily take up any sag or slack in the gate by changing the position of adjustable nuts. I obtain these objects by the mechanism illustrated in the accompanying drawing, in which—

The figure is a perspective view of the lower hinge in position for hanging the gate to the left-hand post.

The same parts are represented by the same letters throughout.

The hinge consists of the eye A, with the screw-shank A', which is to be screwed into the gate-post at the proper place. Into the eye A at right angles to its shank is inserted the screw-shank B' of the eye B, which is held in position by two nuts H G, which work on the shank B' and serve to regulate the position of the eye B in its relation to the eye A. Into the eye B is inserted at right angles to it and to its shank B' the screw-shank C of the hook D, which is also regulated in position by two nuts E F, working one on each side of the eye B upon the screw-shank C. By shifting and tightening the nuts H G—one on each side of A—so as to firmly clamp the eye A, the shank B' and the eye B are firmly held in any position desired in relation to the eye A. By shifting these nuts H G toward the end of the shank B' the eye B, carrying the shank C, and hook D are thrown forward from the post, and thereby the top of the gate, attached to the hook D, is thrown to the right, or downward. By shifting them toward the eye B the eye B is made to approach the post with shank C and hook D, and thereby the top of the gate is drawn to the left, or nearer to the post, or upward, thereby regulating the position of the gate to right and left. By shifting and tightening the nuts E F—one on each side of the eye B—so as to firmly clamp the eye B, the eye B is firmly held in any position desired on the shank C. Also, the hook D and its shank C are regulated in their position by the same nuts. If the nuts E F are made to approach the hook D on the shank C, the distance between the hook D and eye B is shortened, and the top of the gate, resting upon the hook D, is pulled forward in the direction of the eye B. If the nuts are moved toward the end of the shank C and away from the hook D, the top of the gate is moved backward in the opposite direction, away from the eye B. With the eye A and its shank A' to the left, the eye B and its shank B' extending at right angles to the right, and the shank C of the hook D inserted in the eye B on the right, with the hook D pointing upward, represents the hinge in the position shown in the drawing for hanging the gate to the left-hand post. By loosening the nuts E F and turning the hook D downward and securing the same by the nuts, and then turning the hinge over, the hinge will be in position to hang to the right-hand post. An ordinary eye-hinge is used in connection with the gate to work on the hook D. By changing the position of the nuts H G E F the gate is regulated as to its vertical position.

I do not claim hooks and eyes for gate-hinges, broadly; but

What I do claim as my invention, and what I desire to secure by Letters Patent, is—

In a lower gate-hinge, the combination of the eye A and its screw-shank A' with the eye B and its screw-shank B', and the shank C with its hook D, and the nuts H G upon the shank B', holding the eyes A B in proper relations, and the nuts E F, holding the shank C and the hook D in proper relation to the eye B and to the other parts of the hinge, whereby it is rendered reversible, substantially as and for the purposes set forth and described.

JAMES MACY.

Witnesses:
 WILLIAM H. JONES,
 G. W. BEATTY.